US011050678B2

(12) United States Patent
Fenske et al.

(10) Patent No.: US 11,050,678 B2
(45) Date of Patent: Jun. 29, 2021

(54) SITUATION-RELATED PRIORITIZATION OF COMMUNICATION IN NETWORKS

(71) Applicant: International Business Machines Corporation, Armonk, NY (US)

(72) Inventors: Ole Fenske, Wüsten-Vahrnow (DE); Volker Schölles, Schoenaich (DE); Thomas Hermann Gnech, Herrenberg (DE); Stephan Berthold Sell, Magstadt (DE); Heike Cornelia Schmidt, Magstadt (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/662,703

(22) Filed: Oct. 24, 2019

(65) Prior Publication Data
US 2021/0126875 A1 Apr. 29, 2021

(51) Int. Cl.
*H04L 12/911* (2013.01)
*H04L 12/26* (2006.01)
*G06F 40/30* (2020.01)

(52) U.S. Cl.
CPC ............ *H04L 47/821* (2013.01); *G06F 40/30* (2020.01); *H04L 43/16* (2013.01); *H04L 47/828* (2013.01)

(58) Field of Classification Search
CPC ..... H04L 47/821; H04L 43/16; H04L 47/828; G06F 40/30
See application file for complete search history.

(56) References Cited

U.S. PATENT DOCUMENTS

| 6,778,941 | B1 | 8/2004 | Worrell et al. |
| 7,565,403 | B2 | 7/2009 | Horvitz et al. |
| 8,948,720 | B1 * | 2/2015 | Chan ................ H04W 4/90 455/404.1 |

(Continued)

FOREIGN PATENT DOCUMENTS

GB          2447434 A          9/2008

OTHER PUBLICATIONS

Li et al., "Preparedness for Post-Disaster Internet Traffic Management," https://www.researchgate.net/publication/4350931_Preparedness_for_post-disaster_internet_traffic_management, uploaded Sep. 30, 2015, pp. 282-283.

(Continued)

*Primary Examiner* — Caroline H Jahnige
(74) *Attorney, Agent, or Firm* — Kelli D. Morin

(57) ABSTRACT

A method of prioritizing communication in networks on a situation-related basis includes comparing a quantity of incoming communications to a predetermined threshold to determine whether an overload is occurring. The method further includes analyzing content of incoming communications, in response to determining that an overload is occurring, to determine whether the overload is related to a particular situation. The method further includes grouping incoming communications, in response to determining that the overload is related to the particular situation, into prioritized communications and non-prioritized communications. The method further includes transmitting the prioritized communications. The method further includes retaining, without transmitting, the non-prioritized communications in a repository so long as the overload is occurring.

20 Claims, 6 Drawing Sheets

(56) References Cited

U.S. PATENT DOCUMENTS

| | | | |
|---|---|---|---|
| 10,250,543 B2 | 4/2019 | Gnech et al. | |
| 10,638,298 B1* | 4/2020 | Di Domenico | G06N 20/00 |
| 2010/0227581 A1* | 9/2010 | Cook | H04W 4/90 |
| | | | 455/404.1 |
| 2012/0042022 A1* | 2/2012 | Sheth | H04L 51/32 |
| | | | 709/206 |
| 2016/0105446 A1 | 4/2016 | Chen et al. | |
| 2019/0174289 A1* | 6/2019 | Martin | H04W 4/029 |
| 2019/0394251 A1* | 12/2019 | Mehta | H04L 65/602 |
| 2020/0126174 A1* | 4/2020 | Halse | G06F 40/295 |

OTHER PUBLICATIONS

Mdini et al., "Monitoring the network monitoring system: Anomaly Detection using pattern recognition," https://eeexplore.ieee.org/document/7987418, 2017 IFIP/IEEE Symposium on Integrated Network and Service Management (IM), May 8-12, 2017, pp. 983-986.

Nazer et al., "Information Filtering in Social Media During Disasters," https://www.mei.edu/publications/information-filtering-social-media-during-disasters, printed Oct. 22, 2019, 4 pgs.

Wikipedia, "Application-level gateway," wikipedia.org/wiki/Application_Layer_Gateway, printed Jul. 30, 2019, 2 pgs.

Wikipedia, "OSI model," wikipedia.org/wiki/OSI_model, printed Jul. 30, 2019, 8 pgs.

Wikipedia, "Proxy server," wikipedia.org/wiki/Proxy_server, printed Jul. 30, 2019, 8 pgs.

* cited by examiner

SITUATION-RELATED PRIORITIZATION OF COMMUNICATION IN NETWORKS

BACKGROUND

The present disclosure relates generally to the field of network communications, and more particularly to prioritizing communication in networks on a situation-related basis.

SUMMARY

Embodiments of the present disclosure include a method, computer program product, and system for situation-related prioritization of communication in networks. The method includes comparing a quantity of incoming communications to a predetermined threshold to determine whether an overload is occurring. The method further includes analyzing content of incoming communications, in response to determining that an overload is occurring, to determine whether the overload is related to a particular situation. The method further includes grouping incoming communications, in response to determining that the overload is related to the particular situation, into prioritized communications and non-prioritized communications. The method further includes transmitting the prioritized communications. The method further includes retaining, without transmitting, the non-prioritized communications in a repository so long as the overload is occurring.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
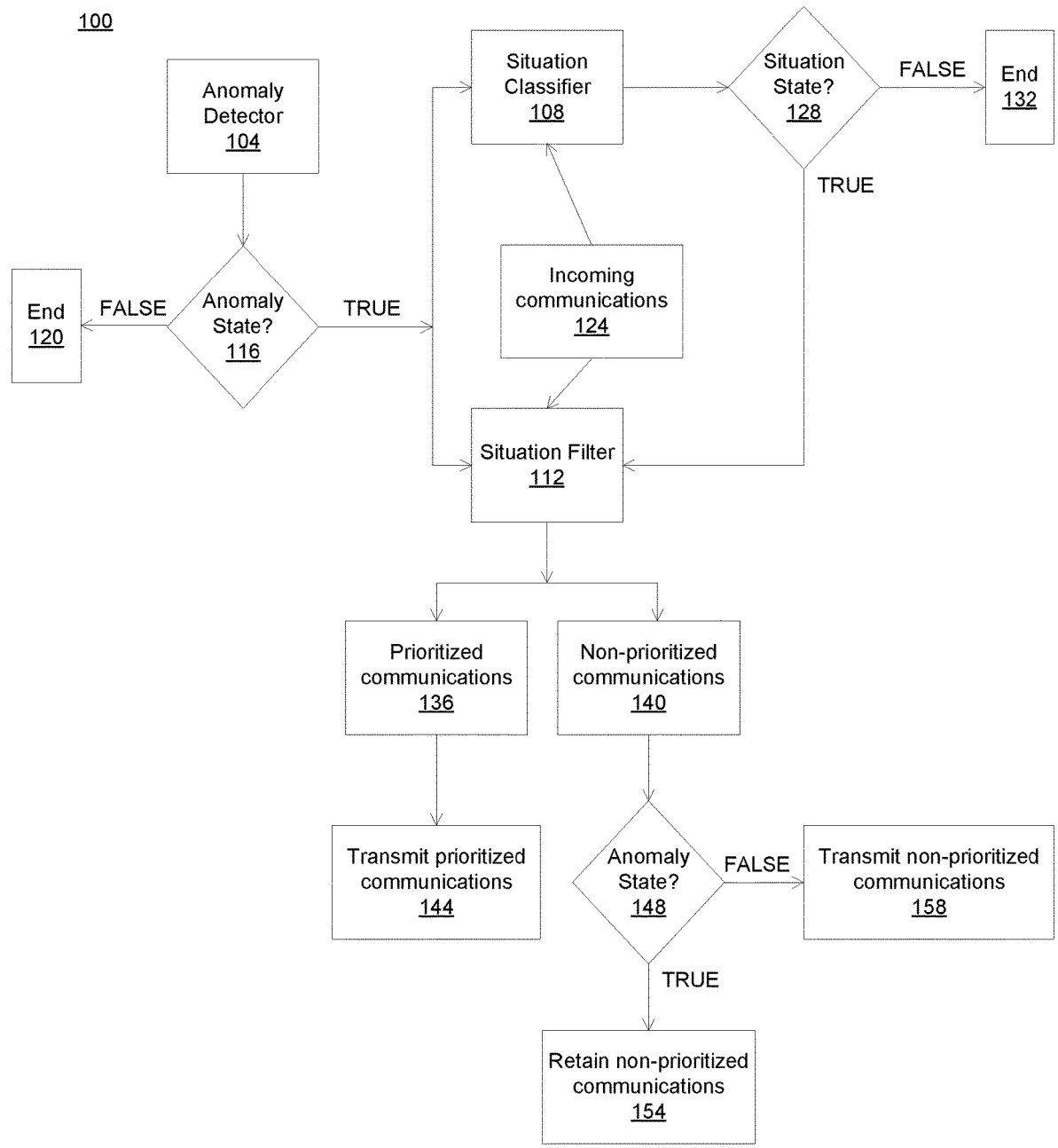
FIG. 1 illustrates a schematic diagram of a system for prioritizing communication in networks on a situation-related basis, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of network communications, and in particular to prioritizing communication in networks on a situation-related basis. While the present disclosure is not necessarily limited to such applications, various aspects of the disclosure may be appreciated through a discussion of various examples using this context.

In particular situations, such as emergency situations, communication networks may become overloaded by a dramatic increase in communication traffic. Such an emergency situation may include, for example, a natural disaster. In such situations, persons being affected by the natural disaster may be sending communications to and/or receiving communications from friends and family regarding their circumstances and condition. For example, affected persons may be sending and/or receiving phone calls, text messages, emails, social media posts, and/or other types of communication. At the same time, local emergency personnel may be receiving communications pertaining to the situation such as, for example, requests for assistance and/or issuing communications pertaining to the situation including, for example, updated information and/or instructions. All of these communications will likely be occurring in a higher volume than is typical for a given network, resulting in the network becoming overloaded by the communications.

While such a situation is occurring, communications to and from emergency personnel and affected persons that pertain to the situation are considered "important." In contrast, incidental communications, unsolicited communications, and/or communications that do not pertain to the situation are considered "unimportant," while the situation is occurring. It is more desirable for "important" communications to be transmitted and received while the situation is occurring than "unimportant" communications. Accordingly, it is desirable to prioritize communication in networks on a situation-related basis.

It is to be understood that the aforementioned advantages are example advantages and should not be construed as limiting. Embodiments of the present disclosure can contain all, some, or none of the aforementioned advantages while remaining within the spirit and scope of the present disclosure.

In at least some embodiments of the present disclosure, the systems and methods described herein may run on communication network nodes, which receive incoming data from different communication devices. Such nodes receive information and route the information to other nodes in the network. Such nodes can also apply filter programs, for example to block SPAM or other malware. To operate, the nodes may use code running on a proxy server or at an application level.

Turning now to the figures, FIG. 1 illustrates a schematic diagram of a system 100 for prioritizing communication in networks on a situation-related basis, in accordance with embodiments of the present disclosure. The system 100 may also be referred to herein as a "situation-related communication filter." In some embodiments of the present disclosure, the system 100 may include an anomaly detector 104, a situation classifier 108, and a situation filter (also referred to herein as an "S-Filter") 112.

The anomaly detector 104 runs constantly, receiving metadata on communication traffic to determine at operation 116 whether or not an anomaly state is present. In some embodiments, the anomaly detector 104 may employ, for example a "k-nearest-neighbors" algorithm to determine whether or not an anomaly state is present. More specifically, in some embodiments, the anomaly detector 104 may employ a "kernel-density-estimation" to determine whether or not an anomaly state is present.

The anomaly detector 104 may determine that an anomaly state is present, for example, if a quantity of incoming communications meets a predetermined threshold. In some embodiments of the present disclosure, the "anomaly" detected by the anomaly detector 104 may indicate, for example, an overload. In other words, the "anomaly state" detected by the anomaly detector 104 may be an overload.

In some embodiments of the present disclosure, the anomaly state, or overload, detected by the anomaly detector 104 may be indicative of an emergency situation, such as a natural disaster. For example, during and/or following an emergency situation, one or more network nodes may experience a significant increase in the amount of network traffic due to proximity to the emergency situation and an increased quantity of incoming and/or outgoing communications to persons affected by the emergency situation.

In some embodiments of the present disclosure, the anomaly detector 104 may detect the presence of an anomaly by comparing a quantity of incoming communications to a predetermined threshold number of communications. In some embodiments, this comparison may be conducted for traffic at a particular network node. In some alternative embodiments, this comparison may be conducted for traffic at a group or sub-set of network nodes. For example, the predetermined threshold number of communications may be set for a particular network node based on an average number of communications transmitted via the particular network node in a given amount of time, taking into consideration some amount of fluctuation that is typical for the particular node.

In some embodiments of the present disclosure, the anomaly detector 104 may detect the presence of an anomaly by comparing a number of instances of content to a predetermined threshold number of instances of content. In some embodiments, a number of instances of content may refer to a number of times a particular verbal term appears in communications, wherein the particular verbal term tends to be indicative of an emergency situation.

If the anomaly detector 104 determines that an anomaly state is not present (anomaly state=FALSE), no further action is taken, and the anomaly detector 104 continues to receive and consider metadata on communication traffic. In other words, when the anomaly state is FALSE, the operation ends 120. Conversely, if the anomaly detector 104 determines that an anomaly state is present (anomaly state=TRUE), then the situation classifier 108 is applied to randomly sampled communications to determine whether or not the anomaly is related to a particular situation.

When the anomaly state is present, the situation classifier 108 receives randomly sampled communications from incoming communications 124 that are being transmitted by the network. In order to determine whether or not the anomaly is related to a particular situation, the situation classifier 108 analyzes the content of the randomly sampled communications from incoming communications 124 for relation to particular situations, as discussed in further detail below. Accordingly, when the anomaly state is present, the situation classifier 108 determines at operation 128 whether or not a situation state is present.

In some embodiments of the present disclosure, the situation state detected by the situation classifier 108 may be indicative of an emergency situation, such as a natural disaster. For example, during and/or following an emergency situation, one or more particular verbal terms may be present in a higher proportion of incoming communications than is typical for incoming communications at that network node.

In some embodiments of the present disclosure, the situation classifier 108 may detect the presence of a situation by comparing a quantity of particular verbal terms and/or other content items to a predetermined threshold number of such terms and/or items. In some embodiments, the situation classifier 108 may perform natural language processing on the randomly sampled communications to determine whether a situation (e.g., a natural disaster) is occurring. For example, the situation classifier 108 may identify, based on the natural language processing, common themes, emotions, and/or tones in the randomly sampled communications, and it may correlate these detected features with a type (e.g., hurricane) or group (e.g., natural disaster) of situations. As used herein, "content terms" and "content items" refer to particular terms and items that appear within the content of the communications, rather than to discrete units of content. For example, a "content item" may refer to a verbal term and/or image representing a sandwich, rather than to a message or an image itself.

In some embodiments, this comparison may be conducted for communications transmitted via a particular network node. In some alternative embodiments, this comparison may be conducted for communications transmitted via a group or sub-set of network nodes. For example, the predetermined threshold number of items and/or terms may be set for a particular network node based on an average number of communications transmitted via the particular network node in a given amount of time, taking into consideration some amount of fluctuation that is typical for the particular node.

If the situation classifier 108 determines that a situation state is not present (situation state=FALSE), no further action is taken, and the situation classifier 108 continues to receive and consider randomly sampled communications from incoming communications 124 so long as the anomaly state is TRUE. In other words, when the situation state is FALSE, the operation ends 132. Conversely, if the situation classifier 108 determines that a situation state is present (situation state=TRUE), then the situation filter 112 is applied to all incoming communications 124 so long as the anomaly state is TRUE. In other words, if the situation classifier 108 determines that a situation state is present, the situation filter 112 is activated, or "switched ON." When the situation filter 112 is activated, it checks the content and data pertaining to each incoming communication 124 to determine whether it is related to the particular situation and whether it is important or unimportant.

Accordingly, the situation filter 112 groups all incoming communications 124 into prioritized communications 136 and non-prioritized communications 140. Prioritized communications 136 are those which are considered "important" while a situation is occurring and/or are directly related to the particular situation. Non-prioritized communications 140 are those which are considered "unimportant" while a situation is occurring and/or are not directly related to the particular situation. In some embodiments of the present disclosure, the situation filter 112 may group the incoming communications 124 based on information such as the sender, the recipient, and/or the content of the communication. In some embodiments of the present disclosure, the situation filter 112 may include operations similar to those of an email spam filter. In some embodiments of the present disclosure, the situation filter 112 applies a "Prioritized" tag to prioritized communications 136 and a "Non-Prioritized" tag to non-prioritized communications 140.

In some embodiments of the present disclosure, natural language processing can be used instead of, or in addition to, a word bank or dictionary. In such embodiments, the situation classifier 108 and/or the situation filter 112 can use one or more natural language processing approaches. For example, the situation classifier 108 and/or the situation filter 112 can use term frequency-inverse document frequency (also referred to as tf-idf), vector space model (also referred to as term vector model), and/or Word2vec or other neural networks to analyze the content of the incoming messages.

Once the situation filter 112 has grouped and/or tagged incoming communications 124 according to their importance, the network treats the groups of communications differently, based on their relative importance given the occurring situation. Due to their relative importance, prioritized communications 136 are always transmitted by the network 144. In contrast, non-prioritized communications 140 are handled differently depending on the anomaly state. Accordingly, the anomaly state 116 is checked again at operation 148 to determine how to treat the non-prioritized communications 140.

If the anomaly state 148 is still present (anomaly state=TRUE), the non-prioritized communications 140 are retained in a repository without being transmitted 154. Accordingly, if the anomaly state 148 is TRUE, then the traffic on the network is reduced during the occurring situation by holding back the "unimportant" communications. Reducing the overall traffic on the network makes more bandwidth available for important communications, such as those directly related to the situation. Conversely, if the anomaly state 148 is no longer present (anomaly state=FALSE), then it is no longer necessary or desirable to hold back "unimportant" communications. Accordingly, if the anomaly state 148 is FALSE, then the non-prioritized communications are released from the repository and are transmitted in the typical manner 158.

Figure 2:
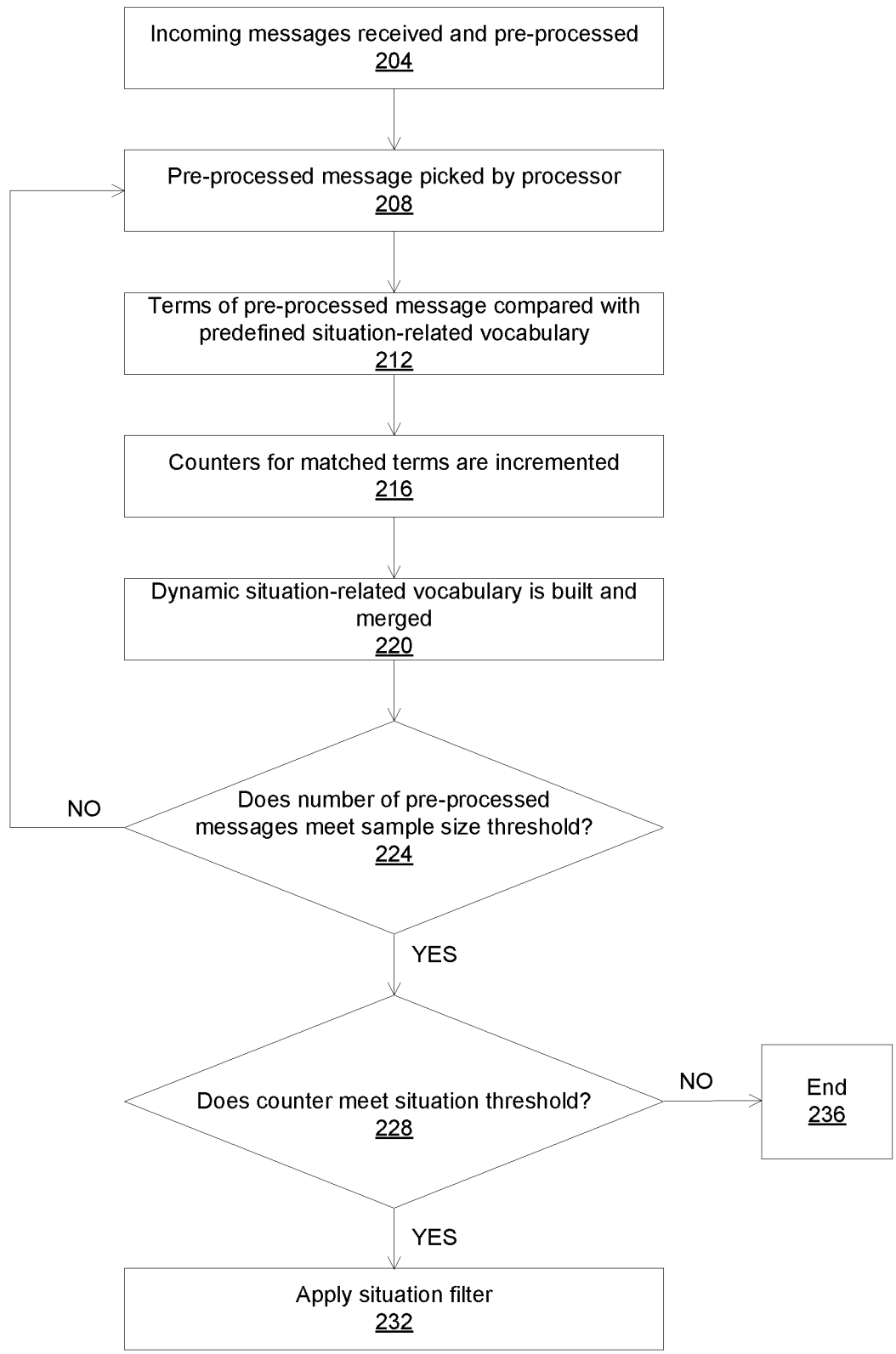
FIG. 2 illustrates a sample flowchart depicting a method of processing communications, in accordance with embodiments of the present disclosure.

In some embodiments of the present disclosure, the incoming communications 124 considered by the situation classifier 108 and situation filter 112 are text messages. FIG. 2 illustrates a flowchart of a method 200 including some of the operations performed by the system 100 in such embodiments. The method 200 can be applied to incoming communications 124 besides text messages. The following example is illustrative.

In the embodiment shown in FIG. 2, the incoming text messages are received and processed by a pre-processor (not shown) at operation 204. The pre-processor normalizes the message content and generates pre-processed messages. Pre-processed messages, for example, may be parsed into terms, such as words or phrases. Pre-processed messages are then available to be picked by a processor. In the example shown, the processor is the situation classifier 108 (shown in FIG. 1). As discussed above, the situation classifier considers only a random sample of the pre-processed messages. Pre-processed messages may also be referred to as a "normalized text input stream."

Once the processor, in this case the situation classifier, picks a pre-processed message at operation 208, the terms of the pre-processed message are compared with a predefined situation-related vocabulary at operation 212. In some embodiments of the present disclosure, the predefined situation-related vocabulary may be, for example, a term "bank" that is an expert-provided bank including situation-specific normalized words and/or terms. Terms in the pre-processed message that also appear in the predefined situation-related vocabulary are matches.

At operation 216, term counters for those terms in the predefined situation-related vocabulary that are matched with terms in the pre-processed message are incremented. In other words, the instance of a matched term is added to a tally that represents the total number of occurrences of the matched term. In some embodiments of the present disclosure, the method 200 then proceeds with operation 220, wherein a dynamic situation-related vocabulary is built and merged. Building and merging the dynamic situation-related vocabulary is discussed in further detail in reference to FIGS. 3 and 4 below. In alternative embodiments, operation 220 can be omitted, and the method 200 instead proceeds with operation 224, wherein the number of pre-processed messages that have been picked by the processor is compared to a sample size threshold.

If the number of pre-processed messages picked by the processor does not meet the sample size threshold, the method 200 returns to operation 208 and another pre-processed message is picked by the processor. Conversely, if the number of pre-processed messages picked by the processor does meet the sample size threshold, the method 200 then proceeds with operation 228, wherein the value of each term counter is compared to a situation threshold. In some alternative embodiments of the present disclosure, the sample size threshold can pertain to a number of matched terms instead of a number of pre-processed messages picked by the processor. In such embodiments, if the number of matched terms does not meet the sample size threshold at operation 224, the method 200 returns to operation 208, and if the number of matched terms meets the sample size threshold, the method 200 proceeds with operation 228.

At operation 228, if no term counter value meets the situation threshold, then the method 200 ends at operation 236. Alternatively, if the value of a term counter meets the situation threshold, then the method 200 proceeds with operation 232, wherein the situation filter is applied to incoming messages. In some embodiments of the present disclosure, the situation threshold can be the same for every term in the predefined situation-related vocabulary. In alternative embodiments of the present disclosure, the situation threshold can be specific to each term in the predefined situation-related vocabulary. In some embodiments of the present disclosure, the situation filter can be applied at operation 232 if any term counter value meets the situation threshold. In alternative embodiments, the situation filter can be applied at operation 232 if a particular number of term counter values meet the situation threshold.

Figure 3:
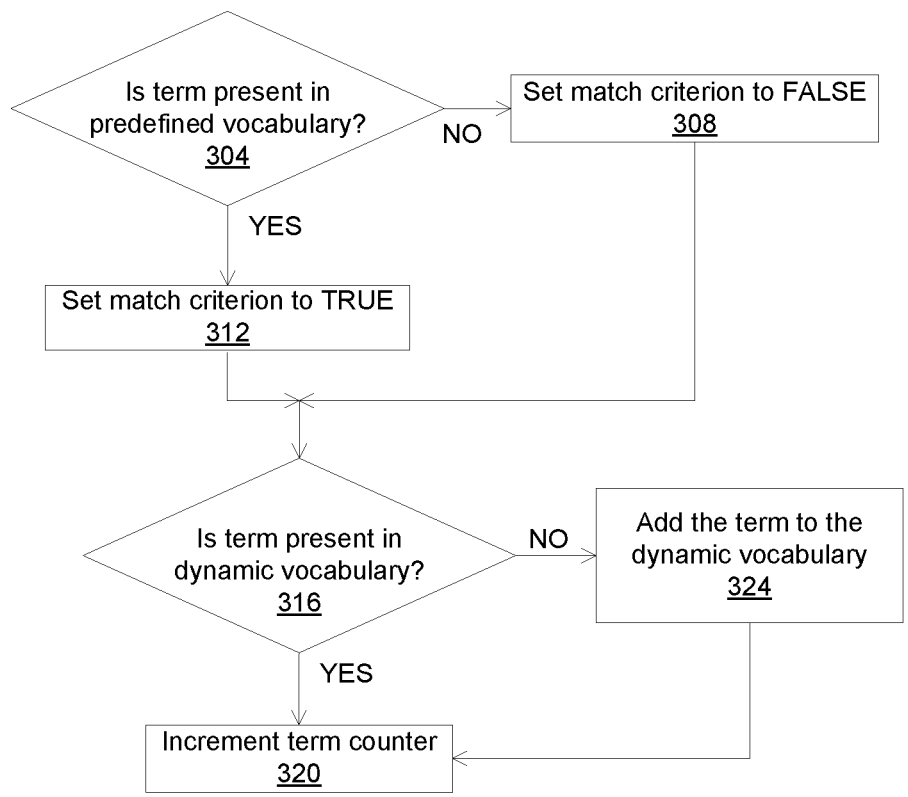
FIG. 3 illustrates a sample flowchart depicting a method of building a vocabulary for processing communications, in accordance with embodiments of the present disclosure.
Figure 4:
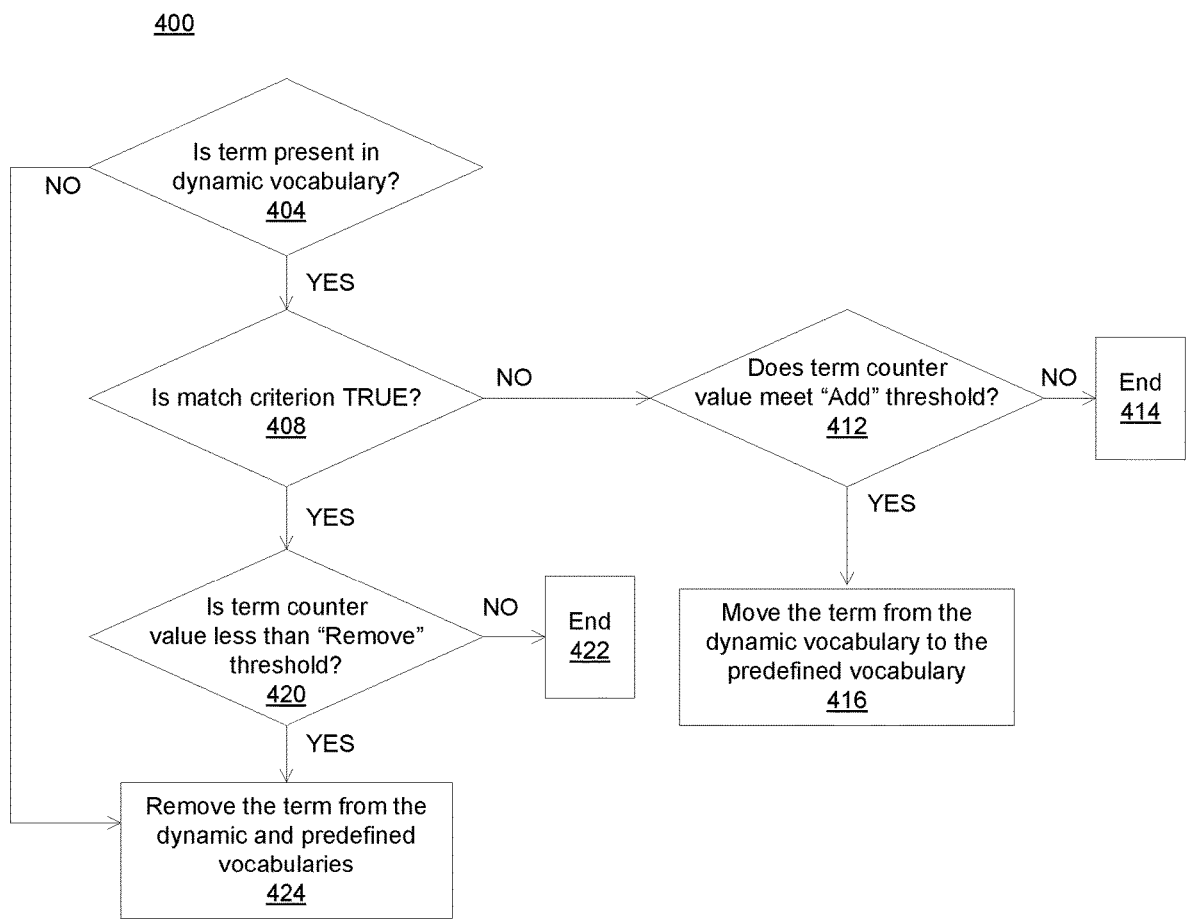
FIG. 4 illustrates a sample flowchart depicting a method of updating a vocabulary for processing communications, in accordance with embodiments of the present disclosure.

FIGS. 3 and 4 illustrate examples of methods performed within the operation 220 of method 200 in more detail. More specifically, FIGS. 3 and 4 illustrate examples of methods 300 and 400 of building a dynamic situation-related vocabulary and merging the dynamic situation-related vocabulary with the predefined situation-related vocabulary, respectively.

The input for the method 300 of building a dynamic situation-related vocabulary is the normalized text input stream of pre-processed messages picked by the situation classifier. At operation 304, a term from a pre-processed message is compared to those provided in a predefined situation-related vocabulary. In some embodiments, the predefined situation-related vocabulary can be, for example, a term "bank." In some embodiments, the term bank of the predefined situation-related vocabulary is initially provided by a human prior to the performance of the method 300. If the term is not present in the predefined situation-related vocabulary, a match criterion for that term is set to FALSE at operation 308. Conversely, if the term is present in the predefined situation-related vocabulary, a match criterion for that term is set to TRUE at operation 312.

Following the setting of the match criterion at operation 308 or 312, the term is compared to a dynamic situation-related vocabulary at operation 316. In some embodiments, the dynamic situation-related vocabulary can be, for example, a term "bank." In some embodiments, the term bank of the dynamic situation-related vocabulary is initially empty prior to the performance of the method 300. If the term is present in the dynamic situation-related vocabulary, then a situation-related vocabulary term counter for that term is incremented at operation 320. Conversely, if the term is not present in the dynamic situation-related vocabulary, then it is added to the dynamic situation-related vocabulary at operation 324 and then the situation-related vocabulary term counter for that term is incremented at operation 320.

Turning now to FIG. 4, method 400 illustrates an embodiment of merging the dynamic situation-related vocabulary with the predefined situation-related vocabulary to update the predefined situation-related vocabulary. The inputs for the method 400 of merging the dynamic situation-related vocabulary and the predefined situation-related vocabulary are: 1) a combined vocabulary, including both the dynamic and the predefined situation-related vocabularies; and 2) the results of the method 300, including the match criteria and the term counter value for each term in the combined vocabulary.

For each term in the combined vocabulary, the term is compared to the dynamic situation-related vocabulary at operation 404. If the term is not present in the dynamic situation-related vocabulary, then it is included in the combined vocabulary due to its presence in the predefined situation-related vocabulary. However, if it was included in the predefined situation-related vocabulary, but was not added to the dynamic situation-related vocabulary during method 300, then it did not appear in the normalized text input stream of pre-processed messages. Accordingly, it can be determined that the term is not useful in the predefined situation-related vocabulary. Accordingly, at operation 424, the term is removed from the predefined situation-related vocabulary.

Conversely, if the term is present in the dynamic situation-related vocabulary, then the method 400 proceeds to operation 408, wherein it is determined whether the match criterion for the term is TRUE. If the match criterion for the term is not TRUE (meaning it is FALSE), this indicates that the term was not present in the predefined situation-related vocabulary prior to the performance of method 300. Accordingly, at operation 412, the method 400 determines whether the term counter value for the term meets a particular "Add" threshold. In other words, it is determined at operation 412 whether the term occurred enough times in the normalized text input stream to meet a threshold of relative relevance. If the term counter value does meet the "Add" threshold, then the term is moved from the dynamic situation-related vocabulary to the predefined situation-related vocabulary at operation 416. Accordingly, the predefined situation-related vocabulary is updated to include a new term that has been discovered to be relevant to the occurring situation. In some embodiments of the present disclosure, the "Add" threshold can be the same for every term. In some alternative embodiments, the "Add" threshold may be specified for each term. If the term counter value is equal to or less than the "Add" threshold, then no further action is taken for that term, as indicated by the end operation 414.

In contrast, a term that was determined to be present in the dynamic situation-related vocabulary at operation 404 and was determined to have a match criterion of TRUE at operation 408 was present in the predefined situation-related vocabulary prior to the performance of method 300 and did appear in the normalized text input stream. For such terms, the method 400 proceeds with operation 420, wherein it is determined whether the term counter value for the term is less than a particular "Remove" threshold. In other words, it is determined at operation 420 whether a term occurred rarely enough to indicate that the term is not useful in the predefined situation-related vocabulary. If the term counter value is less than the "Remove" threshold, then the term is removed from both the dynamic and the predefined situation-related vocabularies at operation 424. In some embodiments of the present disclosure, the "Remove" threshold can be the same for every term. In some alternative embodiments, the "Remove" threshold may be specified for each term. If the term counter value is equal to or greater than the "Remove" threshold, then no further action is taken for that term, as indicated by the end operation 422.

Building the dynamic situation-related vocabulary with the pre-processed messages of the normalized text input stream in the manner illustrated by method 300 in FIG. 3 and merging that vocabulary with the predetermined situation-related vocabulary in the manner illustrated by method 400 in FIG. 4 enables the predetermined situation-related vocabulary to be updated and modified in real-time, as emergency situations and events are unfolding. This capability enables the situation classifier 108 to operate proactively, rather than reactively, to occurring situations.

By way of example, assume that the dynamic situation-related vocabulary is empty, that the predefined situation-related vocabulary includes the terms A, B, and C, and that a pre-processed message in the normalized text input stream includes the terms B, D, and B. At operation 304 of method 300, the term B from the normalized text input stream is compared to the predefined situation-related vocabulary. Because the predefined situation-related vocabulary does include the term B, the match criterion for term B is set to TRUE at operation 312. Because the dynamic situation-related vocabulary is empty, it is determined at operation 316 that the term B is not present in the dynamic situation-related vocabulary. Accordingly, the term B is added to the dynamic situation-related vocabulary at operation 324, and value of the term counter for term B is incremented to 1 at operation 320. The same method is applied to term D, with the result that the match criterion is set to FALSE at operation 308 (because the term D was not included in the predefined situation-related vocabulary), the term D is added to the dynamic situation-related vocabulary at operation 324, and the value of the term counter for term D is incremented to 1 at operation 320. For the second instance of term B in the normalized text input stream, the match criterion for term B remains TRUE at operation 312, and the value of the term counter for term B is incremented to 2 at operation 320.

For the merge method 400, the combined vocabulary includes terms A, B, C, and D. For term A, it is determined at operation 404 that the term A is not present in the dynamic situation-related vocabulary. Accordingly, the term A is removed from the predefined and dynamic situation-related vocabularies at operation 424. For term B, it is determined at operation 404 that the term B is present in the dynamic situation-related vocabulary. At operation 408, it is determined that the match criterion for the term B was set to TRUE. Accordingly, the value of the term counter for term B, which is 2, is compared to the "Remove" threshold. Assuming that the "Remove" threshold for term B is 2, then it is determined at operation 420 that the value term counter is not less than the "Remove" threshold. Accordingly, at operation 422, the term B is left in the predefined situation-related vocabulary. For term C, it is determined at operation 404 that the term C is not present in the dynamic situation-related vocabulary. Accordingly, the term C is removed from the predefined situation-related vocabulary at operation 424. For term D, it is determined at operation 404 that the term D is present in the dynamic situation-related vocabulary. At operation 408, it is determined that the match criterion for term D was set to FALSE. Accordingly, the value of the term counter for term D, which is 1, is compared to the "Add" threshold. Assuming that the "Add" threshold for term D is 1, then it is determined at operation 412 that the value term counter does meet the "Add" threshold. Accordingly, at operation 416, term D is moved from the dynamic situation-related vocabulary to the predefined situation-related vocabulary.

In some embodiments of the present disclosure, the method 300 is performed prior to method 400. In some embodiments of the present disclosure, methods 300 and 400 may be performed multiple times such that method 300 follows performance of method 400. In some embodiments of the present disclosure, the method 300 and the method 400 are performed contemporaneously or overlapping with one another.

The methods 200, 300, and/or 400, and/or other methods performed by the system 100 may be performed by hardware, firmware, software executing on a processor, or any combination thereof.

Figure 5:
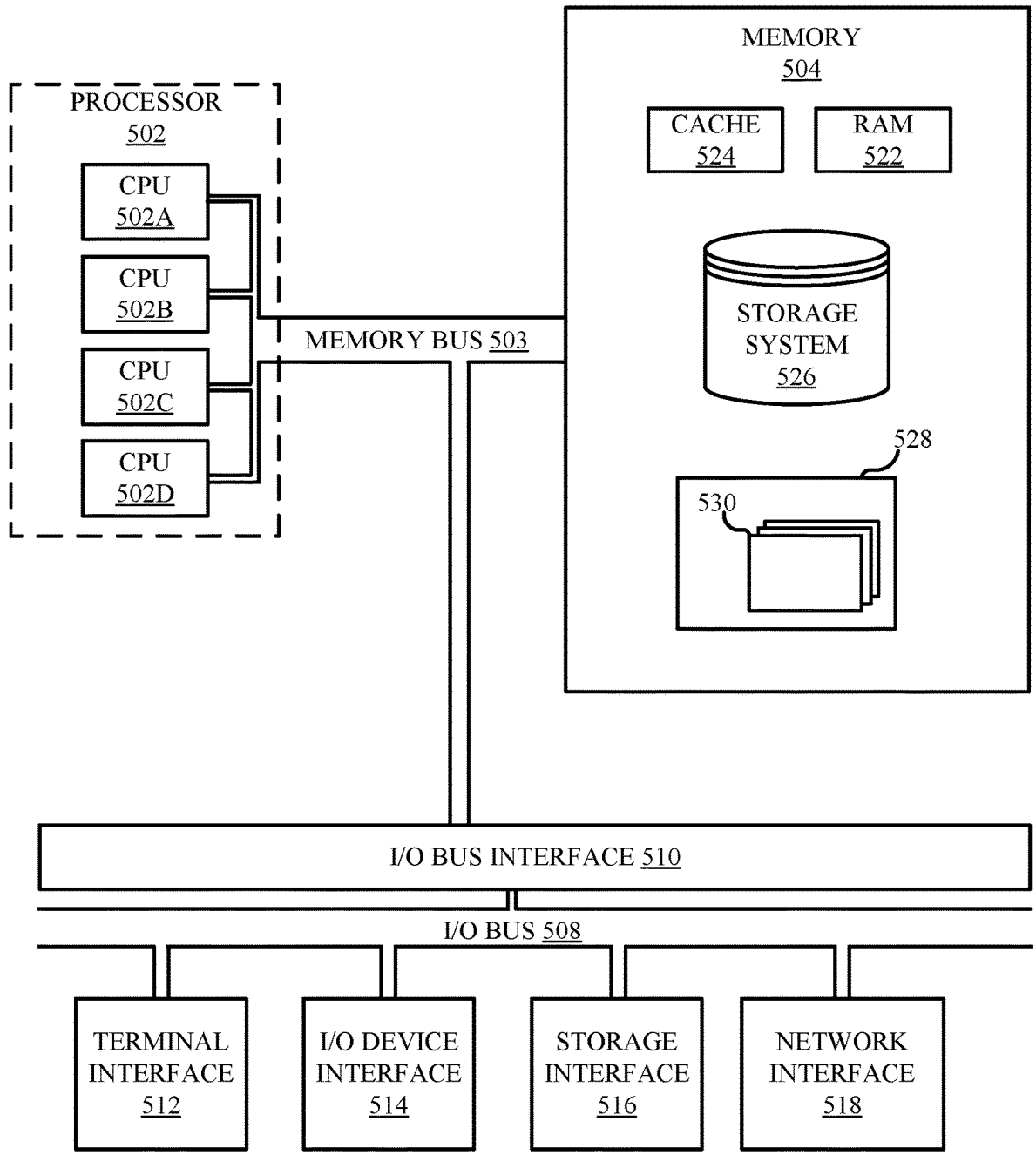
FIG. 5 illustrates a high-level block diagram of an example computer system that may be used in implementing one or more of the methods, tools, and modules, and any related functions, described herein, in accordance with embodiments of the present disclosure.

Referring now to FIG. 5, shown is a high-level block diagram of an example computer system 501 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 501 may comprise one or more CPUs 502, a memory subsystem 504, a terminal interface 512, a storage interface 516, an I/O (Input/Output) device interface 514, and a network interface 518, all of which may be communicatively coupled, directly or indirectly, for inter-component communication via a memory bus 503, an I/O bus 508, and an I/O bus interface unit 510.

The computer system 501 may contain one or more general-purpose programmable central processing units (CPUs) 502A, 502B, 502C, and 502D, herein generically referred to as the CPU 502. In some embodiments, the computer system 501 may contain multiple processors typical of a relatively large system; however, in other embodiments the computer system 501 may alternatively be a single CPU system. Each CPU 502 may execute instructions stored in the memory subsystem 504 and may include one or more levels of on-board cache.

The memory subsystem 504 may include computer system readable media in the form of volatile memory, such as random access memory (RAM) 522 or cache memory 524. Computer system 501 may further include other removable/non-removable, volatile/non-volatile computer system storage media. By way of example only, storage system 526 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 504 can include flash memory, e.g., a flash memory stick drive or a flash drive. Memory devices can be connected to memory bus 503 by one or more data media interfaces. The memory 504 may include at least one program product having a set (e.g., at least one) of program modules that are configured to carry out the functions of various embodiments.

One or more programs/utilities 528, each having at least one set of program modules 530 may be stored in memory 504. The programs/utilities 528 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Program modules 530 generally perform the functions or methodologies of various embodiments.

Although the memory bus 503 is shown in FIG. 5 as a single bus structure providing a direct communication path among the CPUs 502, the memory subsystem 504, and the I/O bus interface 510, the memory bus 503 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 501 may, in some embodiments, contain multiple I/O bus interface units 510, multiple I/O buses 508, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 501 may be a multi-user mainframe computer system, a single-user system, or a server computer or similar device that has little or no direct user interface, but receives requests from other computer systems (clients). Further, in some embodiments, the computer system 501 may be implemented as a desktop computer, portable computer, laptop or notebook computer, tablet computer, pocket computer, telephone, smart phone, network switches or routers, or any other appropriate type of electronic device.

It is noted that FIG. 5 is intended to depict the representative major components of an exemplary computer system 501. In some embodiments, however, individual components may have greater or lesser complexity than as represented in FIG. 5, components other than or in addition to those shown in FIG. 5 may be present, and the number, type, and configuration of such components may vary.

Figure 6:
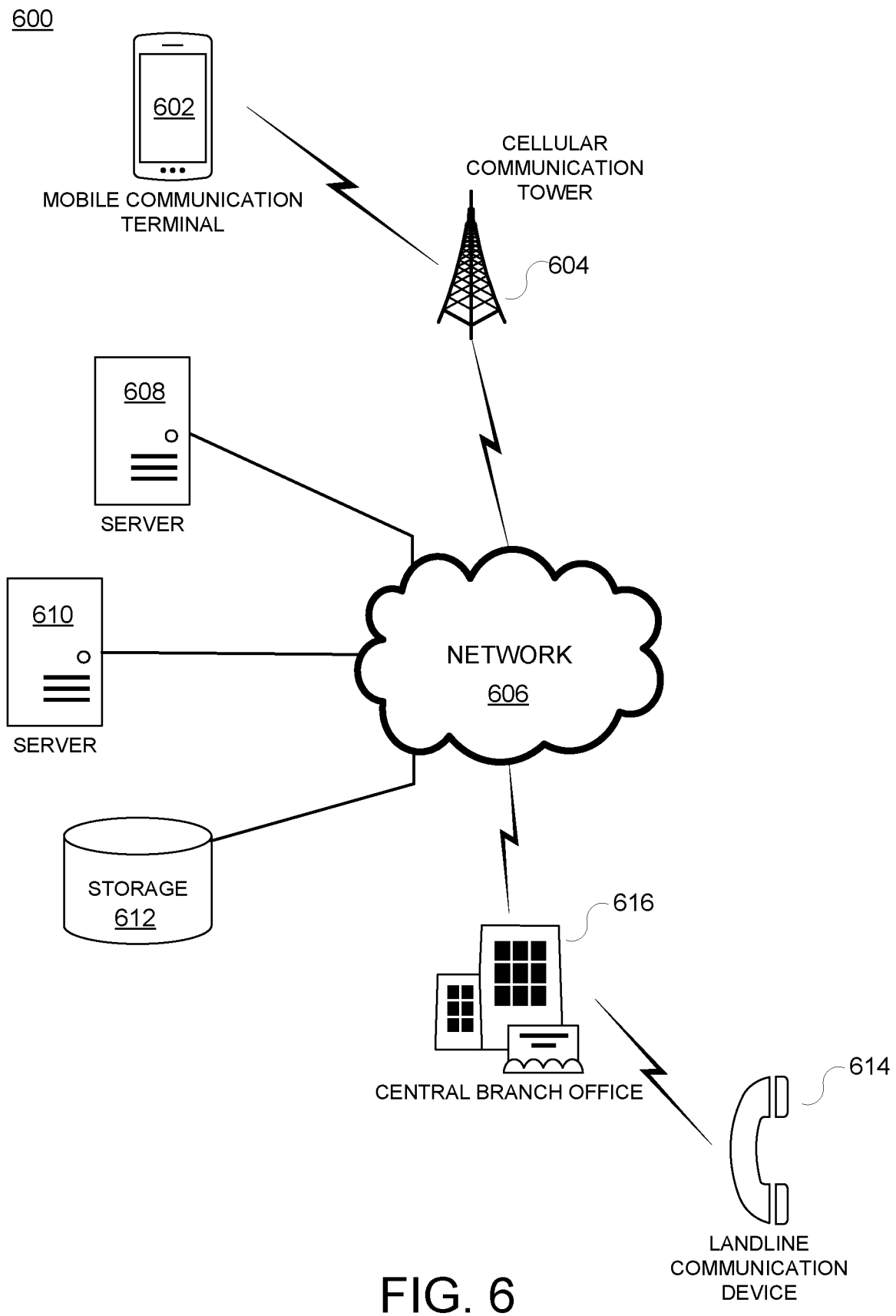
FIG. 6 illustrates a schematic diagram of a telecommunication network in which illustrative embodiments of the present disclosure may be implemented.

With reference now to FIG. 6, shown is a pictorial representation of a telecommunication network 600 in which illustrative embodiments may be implemented. Telecommunication network 600 may be a network of computers, mobile communication terminals, landline communication devices, cellular communication towers, central branch offices, and other data processing devices in which the illustrative embodiments may be implemented. Telecommunication network 600 contains network 606, which is the medium used to provide communications links between the computers, mobile communication terminals, landline communication devices, cellular communication towers, central branch offices, and the other data processing devices connected together within telecommunication network 600. Network 606 may include connections such as, for example, wired communication links, wireless communication links, and fiber optic cables.

In the depicted example, first server 608 and second server 610 connect to network 606, along with storage 612. First server 608 and second server 610 may be, for example, server computers with high-speed connections to network 606. In addition, first server 608 and second server 610 may provide a set of one or more services to client devices connected to network 606. For example, first server 608 and second server 610 may be receivers that provide one or more telecommunication system services, such as the methods 200, 300, and/or 400, and/or other methods performed by the system 100, to the client devices connected to the network 606. In other words, the methods 200, 300, and/or 400, and/or other methods performed by the system 100 may be performed by one or more of the first server 608 and the second server 610. Additionally, or alternatively, one or more of the anomaly detector 104, the situation classifier 108, and the situation filter 112 may be present in one or more of the first server 608 and the second server 610.

Mobile communication terminal 602 and landline communication device 614 also connect to network 606 via cellular communication tower 614 and central branch office 616, respectively. It should be noted that mobile communication terminal 602, landline communication device 614, cellular communication tower 604, and central branch office 616 represent any number of (e.g., a plurality of) mobile communication terminals, landline communication devices, cellular communication towers, and central branch offices connected to network 606. Mobile communication terminal 602 and landline communication device 614 are clients of first server 608 and second server 610. In the depicted example, first server 608 and second server 610 may provide information, such as boot files, operating system images, and applications to mobile communication terminal 602 and landline communication device 614. First server 608 and second server 610 may also provide voicemail services to mobile communication terminal 602 and landline communication device 614.

Mobile communication terminal 602 may be, for example, a smart phone, a cellular telephone, a desktop computer, a laptop computer, a handheld computer, a tablet, a personal digital assistant, or a gaming device with wireless communication links to network 606. Landline communication device 614 may be, for example, a standard handset telephone, a cordless handset telephone, or a desktop computer. It should be noted that mobile communication terminal 602 and landline communication device 614 may represent any combination of different mobile communication terminals and landline communication devices connected to network 606.

Cellular communication tower 604 may wirelessly connect to network 606. Cellular communication tower 604 is a fixed-location transceiver that wirelessly communicates directly with mobile communication terminal 602. Cellular communication tower 604 serves a cell within the telecommunication system. Typically, a mobile communication terminal connects with the nearest available cellular communication tower. A mobile communication terminal makes and receives calls through the cellular communication tower that the mobile communication terminal is currently connected to within a cell. A mobile communication terminal is able to move from cell to cell during an ongoing continuous communication by one cellular communication tower in one cell handing off or handing over the mobile communication terminal to another cellular communication tower in another cell.

Central branch office 616 connects to network 606 using wired connections. Central branch office 616 is a fixed-location telephone exchange or central office telephone switch used to connect and route telephone calls in a public switched telephone network (PSTN). Multiple telephone switches capable of handling hundreds of thousands of telephone calls per hour may be housed within central branch office 616. Landline communication device 614 connects to central branch office 616 via wire connections.

Storage 612 is a network storage device capable of storing data in a structured format or unstructured format. Storage 612 may provide storage of a plurality of different user names and associated identification numbers, user profiles, and user account information associated with the telecommunication system. Further, storage 612 may store other data, such as authentication or credential data that may include user names, passwords, and biometric data associated with each of the plurality of users or system administrators. Additionally, storage 612 may store term banks, such as the dynamic situation-related vocabulary and the predefined situation-related vocabulary, and/or logs of activities that affect such term banks. It should be noted that storage unit 612 may include any data that may be utilized by the telecommunication system.

Also, it should be noted that telecommunication network 600 may include any number of additional server devices, mobile communication terminals, landline communication devices, cellular communication towers, central branch offices, storage devices, and other devices not shown. Program code located in telecommunication network 600 may be stored on a computer readable storage medium and downloaded to a computer or other data processing device for use.

For example, program code may be stored on a computer readable storage medium on first server 608.

In the depicted example, telecommunication network 600 may be implemented as a number of different types of telecommunication networks, such as, for example, an internet, an intranet, a local area network (LAN), and a wide area network (WAN). FIG. 6 is intended as an example, and not as an architectural limitation for the different illustrative embodiments.

In addition to embodiments described above, other embodiments having fewer operational steps, more operational steps, or different operational steps are contemplated. Also, some embodiments may perform some or all of the above operational steps in a different order. Furthermore, multiple operations may occur at the same time or as an internal part of a larger process. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

As used herein, "a number of" when used with reference to items, means one or more items. For example, "a number of different types of networks" is one or more different types of networks.

When different reference numbers comprise a common number followed by differing letters (e.g., 100a, 100b, 100c) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A method comprising:
   comparing a quantity of incoming communications to a predetermined threshold to determine whether an overload is occurring;
   analyzing content of a set of incoming communications, in response to determining that the overload is occurring, to determine whether the overload is related to a particular situation, wherein analyzing content includes comparing terms included in the content with terms included in a predefined term bank and building a dynamic term bank that is merged with the predefined term bank in order to update the predefined term bank in real time;
   grouping incoming communications, in response to determining that the overload is related to the particular situation, into prioritized communications and non-prioritized communications;
   transmitting the prioritized communications; and
   retaining, without transmitting, the non-prioritized communications in a repository so long as the overload is occurring.

2. The method of claim 1, further comprising:
   transmitting the non-prioritized communications from the repository in response to determining that the overload is no longer occurring.

3. The method of claim 1, wherein comparing the quantity of incoming communications to the predetermined threshold includes comparing a number of discrete communications to a predetermined threshold number of communications.

4. The method of claim 1, wherein comparing the quantity of incoming communications to the predetermined threshold includes comparing a number of instances of content to a predetermined threshold number of instances of content.

5. The method of claim 1, wherein comparing terms included in the content with terms included in the predefined term bank includes determining whether terms included in the content are present in the predefined term bank.

6. The method of claim 5, further comprising:
updating the predefined term bank in response to determining that the overload is related to a predefined situation.

7. The method of claim 6, wherein updating the predefined term bank includes adding particular vocabulary terms to the predefined term bank in response to determining that the particular vocabulary terms are present in the incoming communications and are missing from the predefined term bank.

8. The method of claim 6, wherein updating the predefined term bank includes removing particular vocabulary terms from the predefined term bank in response to determining that the particular vocabulary terms are present in the predefined term bank and are missing from the incoming communications.

9. A computer program product comprising a computer readable storage medium having program instructions embodied therewith, the program instructions executable by a processor to cause the processor to perform a method comprising:
comparing a quantity of incoming communications to a predetermined threshold to determine whether an overload is occurring;
analyzing content of a set of incoming communications, in response to determining that the overload is occurring, to determine whether the overload is related to a particular situation, wherein analyzing content includes comparing terms included in the content with terms included in a predefined term bank and building a dynamic term bank that is merged with the predefined term bank in order to update the predefined term bank in real time;
grouping incoming communications, in response to determining that the overload is related to the particular situation, into prioritized communications and non-prioritized communications;
transmitting the prioritized communications; and
retaining, without transmitting, the non-prioritized communications in a repository so long as the overload is occurring.

10. The computer program product of claim 9, wherein the method further comprises transmitting the non-prioritized communications from the repository in response to determining that the overload is no longer occurring.

11. The computer program product of claim 9, wherein comparing the quantity of incoming communications to the predetermined threshold includes comparing a number of discrete communications to a predetermined threshold number of communications.

12. The computer program product of claim 9, wherein comparing the quantity of incoming communications to the predetermined threshold includes comparing a number of instances of content to a predetermined threshold number of instances of content.

13. The computer program product of claim 9, wherein comparing terms included in the content with terms included in the predefined term bank includes determining whether terms included in the content are present in the predefined term bank.

14. The computer program product of claim 13, wherein the method further comprises updating the predefined term bank in response to determining that the overload is related to a predefined situation.

15. The computer program product of claim 14, wherein:
updating the predefined term bank includes adding particular vocabulary terms to the predefined term bank in response to determining that the particular vocabulary terms are present in the incoming communications and are missing from the predefined term bank.

16. The computer program product of claim 14, wherein:
updating the predefined term bank includes removing particular vocabulary terms from the predefined term bank in response to determining that the particular vocabulary terms are present in the predefined term bank and are missing from the incoming communications.

17. A system comprising:
a memory; and
a processor communicatively coupled to the memory, wherein the processor is configured to perform a method comprising:
comparing a quantity of incoming communications to a predetermined threshold to determine whether an overload is occurring;
analyzing content of a set of incoming communications, in response to determining that the overload is occurring, to determine whether the overload is related to a particular situation, wherein analyzing content includes comparing terms included in the content with terms included in a predefined term bank and building a dynamic term bank that is merged with the predefined term bank in order to update the predefined term bank in real time;
grouping incoming communications, in response to determining that the overload is related to the particular situation, into prioritized communications and non-prioritized communications;
transmitting the prioritized communications; and
retaining, without transmitting, the non-prioritized communications in a repository so long as the overload is occurring.

18. The system of claim 17, wherein the method further comprises transmitting the non-prioritized communications from the repository in response to determining that the overload is no longer occurring.

19. The system of claim 17, wherein comparing the quantity of incoming communications to a predetermined threshold includes comparing a number of discrete communications to a predetermined threshold number of communications.

20. The system of claim 19, wherein:
comparing terms included in the content to a with terms included in the predefined term bank includes determining whether terms included in the content are present in the predefined term bank; and
updating the predefined term bank includes adding particular vocabulary terms to the predefined term bank in response to determining that the particular vocabulary terms are present in the incoming communications and are missing from the predefined term bank.

* * * * *